United States Patent
Higgins

[11] 3,765,376
[45] Oct. 16, 1973

[54] DECORATIVE ANIMAL COLLAR ATTACHMENT

[76] Inventor: Wilja M. Higgins, 2150 Kennesaw Way, Smyrna, Ga. 30080

[22] Filed: Dec. 20, 1971

[21] Appl. No.: 209,775

[52] U.S. Cl. .................................. 119/106, 63/2
[51] Int. Cl. ............................................ A01k 27/00
[58] Field of Search ............... 119/106, 109; 2/338; 63/1 R, 3, 4, 2

[56] References Cited
UNITED STATES PATENTS

| | | | |
|---|---|---|---|
| 1,774,222 | 8/1930 | Bermejo et al. ..................... | 2/338 X |
| 1,403,956 | 1/1922 | Hobson............................... | 119/106 |
| 1,725,998 | 8/1929 | Rockwood............................ | 2/338 |
| 1,525,005 | 2/1925 | Sherman.............................. | 63/1 R |

FOREIGN PATENTS OR APPLICATIONS

| 458,518 | 12/1936 | Great Britain....................... | 119/106 |

Primary Examiner—Russell R. Kinsey
Assistant Examiner—J. N. Eskovitz
Attorney—Patrick F. Henry

[57] ABSTRACT

An ornamental jeweled or beaded dog collar attachment which combines with the medicated plastic collars sometimes known as "flea collars" used on dogs and cats to retard fleas and ticks. A thin, elastic jewelry rope is threaded with beads forming a series of joined loops through which the plastic flea collar is threaded from one side to the other and from back to front to decorate the plastic flea collar and help conceal it from view by means of false jewels, glass beads and the like. Transverse strings of beads or jewels across the loops provide support members for the flea collar when it is threaded into the loops.

4 Claims, 5 Drawing Figures

PATENTED OCT 16 1973 3,765,376

INVENTOR
WILJA M. HIGGINS

BY
ATTORNEY

DECORATIVE ANIMAL COLLAR ATTACHMENT

BACKGROUND OF THE INVENTION

1. Field of the Invention

Dog collars and other animal collars and particularly decorative dog collars having separable or detachable portions such as changeable decorations or identification.

2. Description of the Prior Art

The usual decorative dog collar is made of leather or plastic and has false jewels or metal decorations set into the collar by punching, riveting and the like. Studded collars are well known and even go so far as to include sharp pointed studs as well as rounded metal buttons and the like. These collars are manufactured in that form and are not readily capable of any change. The so-called flea collars presently on the market are merely thin strips of plastic which have been impregnated with medication to be absorbed by the skin of the dog or cat or other animal and such collars should be next to the dog's skin. These flea collars are not very decorative and in fact are quite unattractive and for this reason many dog and cat owners attempt to seal these inside of or next to the regular dog collar. This provides a very awkward arrangement which is bulky and somewhat uncomfortable plus not looking very good because the flea collar is not well hidden and the flea collar moves out of alignment with the regular collar. Many owners of fine pedigreed or thoroughbred animals like to have different collars and different outfits for the dog for show or for other reasons but at the same time like to use the medicated flea collars for protection to the animal. The problem with the plain medicated flea collar has been solved by means of a second collar which receives and fits around the medicated flea collar or any other collar for that matter in a very simple manner.

SUMMARY OF THE INVENTION

A decorative collar made from false jewels, decorative metal or any other interesting or unusual decorations, includes a series of loops for the purpose of having a first collar such as a medicated, plastic flea collar threaded or inserted therein from back to front and throughout substantially the length of the first collar to decorate same and to cover it with ornamentation but leaving plenty of openings for the flea collar to contact the skin of the animal. The present collar may be made in different sizes and shapes and will receive substantially any properly sized flea collar or other plain collar and is easily installed thereon or removed therefrom and during use does not spoil the medical effect of the flea collar.

An object of this invention is to provide quick and easy ornamentation for plain or otherwise unattractive dog and other animal collars.

Another object of this invention is to provide a relatively inexpensive length of ornamentation which receives a plain animal collar therein and is quickly installed or removed therefrom.

An additional feature of this invention is found in the simplicity of construction wherein cheap beads or other ornamentation may be threaded onto elastic rope and attached in place by tying the ends to the collar to which the device is attached.

DESCRIPTION OF THE PREFERRED EMBODIMENT

Figure 1:
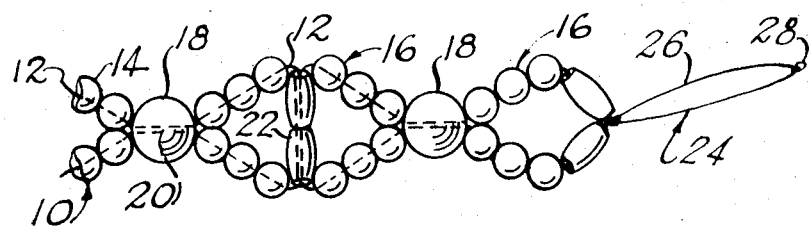
FIG. 1 is a plan view of a portion of the present collar attachment prior to installation on a flea collar.

A typical decorative collar is shown in FIG. 1 and designated generally by reference numeral 10. It should be understood that while beads are shown with relative sizes this is for purpose of illustration and selection of one known preferred embodiment and it is possible to vary the ornamentation, jewels and other ornamental devices depending upon the imagination. Elastic string 12, or jewelry rope or any other similar member, has continuously threaded thereon a series of small beads 14 which are formed into loops designated generally by reference numeral 16 each connected by a large bead 18 which is done by threading the continuous member 12 with a series of beads 14 and separating both parts of the loop designated 20 in FIG. 1 with a large bead 18. Also at each loop 16 the member 12 is carried across to receive beads 22 providing a transverse support in each loop 16. At each end of the continuous ornamental collar 10 there is an elastic attachment means 24 comprising a small piece of the elastic member 12 shaped into a loop 26 and tied on the end 28.

Figure 2:
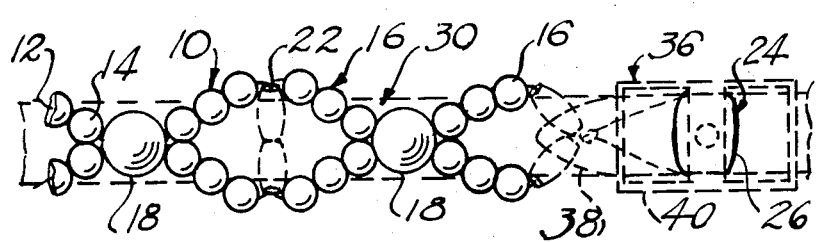
FIG. 2 is a plan view of the ornamental collar shown in FIG. 1 having a flea collar inserted therein and tied thereto.
Figure 3:
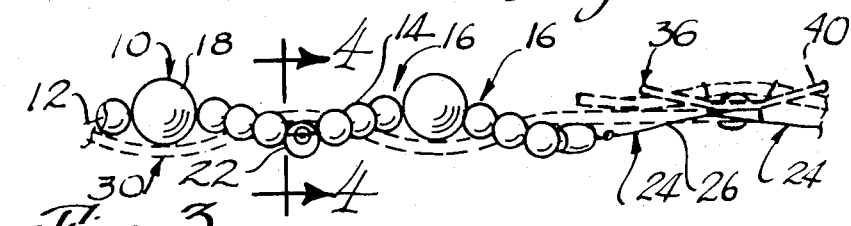
FIG. 3 is a side elevation view of the arrangement shown in FIG. 2.
Figure 4:
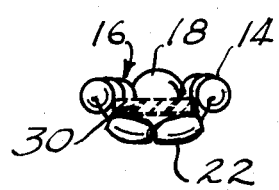
FIG. 4 is a cross-sectional view taken substantially along lines 4—4 in FIG. 3.

With reference to FIG. 2 it is seen that a typical plastic, medicated flea collar which is sold under many different names such as "Sargent" or Hartz Mountain" is designated generally by reference numeral 30 and is essentially a band or strip of plastic impregnated with a chemical and provided with the usual dog collar buckle 36 on one end receiving the tongue 38 of the other end of the collar 30 and held in place by the buckle member 40. The chemical in the collar 30 is absorbed into the dog's system through the skin to discourage fleas, ticks, etc.

Starting, for example, at the end of the ornamental collar 10 shown in FIG. 1 at the loop 24 the tongue or the end of the medicated collar 30 is inserted through the first loop 16 as shown in FIG. 2 and thence beneath the first bead 18, then through the second loop 16 and across the transverse beads 22, then beneath the next bead 18 and so on until the tongue of the medicated collar 30 is back at the other end of the ornamental collar 10 at which time each of the loops 24 on each end of the ornamental collar 10 is attached around the respective buckle 36 and around the tongue 38.

Figure 5:
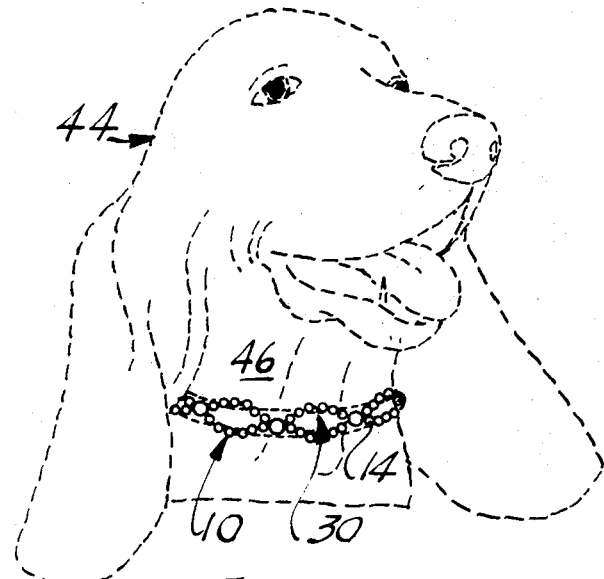
FIG. 5 is a perspective view of the collar arrangement shown in FIG. 2 in place on a typical dog.

The final effect is generally that shown depicted in FIG. 5 within the limitations of drawings and presents a very pleasing and attractive appearance of a single unitary dog collar which is decorated by colored and ornamental jewels 14, 22, 18. No other collar is necessary and therefore the usual leather collar worn by the dog designated generally 44 on the neck 46 thereon may be eliminated. Metal buttons may be used or metal beads may be used and the collar may be made more masculine or more feminine depending upon the particular market to be developed. Also, the elastic can be a very strong nylon cord which is practically unbreakable under normal use and has an unlimited number of ways and patterns the ornamentation may be assembled. The same flea collar 30 may be provided with different ornamental collars 10 by removing one and replacing it with another which can be done in a few minutes or less. The cost of construction of the ornamental collar 10 is so low that in some forms it could almost be given away as a premium item with the purchase of a flea collar. It would be possible to package many different versions of the ornamental collar 10 in one package so that the owner has a choice from time to time. It will be possible to provide brass or other beads for use as the beads 14, 18, 22 so that a very rugged looking collar is provided for bird dogs, large police dogs and the like.

Therefore, while I have shown and described a particular version of this decorative and ornamental collar for use with some other plain collar this is by way of illustration only of a preferred embodiment and does not constitute any sort of limitation since there are various alterations, changes, substitutions, eliminations, deviations and departures may be made in the embodiment shown and described without avoiding the scope of my invention as defined by a proper interpretation of the appended claims.

I claim:

1. In a decorative animal collar combined with another animal collar such as a medicated flea collar:
 a. a series of connected loops defining connected openings on said decorative animal collar having decorative or ornamental members retained thereon, said openings receiving the other animal collar in an interlaced arrangement,
 b. said loops being constructed from continuous lengths of flexible members such as string having the ornamental members thereon,
 c. and some of the loops having transverse supports thereon which extend transversely across the decorative animal collar to provide transverse support across which the portion of the other animal collar is inserted and supported alternatively on one side and the other from one loop to the next in an over-and-under pattern whereby the other animal collar is inserted through the decorative animal collar across one side of a transverse support and then through a loop and over and across the other side of a transverse support whereby the decorations extend along the outside of said other animal collar.

2. The combination in claim 1 wherein:
 d. said flexible member is a string and said ornamental members are beads on said string and said transverse supports being beads on said string.

3. The combination in claim 2 wherein:
 said string is arranged into said loops by means of separate pieces of string separated by said transverse beads.

4. The combination in claim 2 wherein: there is at least one large bead between adjacent loops.

* * * * *